(12) United States Patent
Ishii et al.

(10) Patent No.: US 11,112,627 B2
(45) Date of Patent: Sep. 7, 2021

(54) VIEWING ANGLE CONTROL UNIT, SUBSTRATE ASSEMBLY OF THE VIEWING ANGLE CONTROL UNIT, AND DISPLAY ASSEMBLY

(71) Applicant: Panasonic Liquid Crystal Display Co., Ltd., Hyogo (JP)

(72) Inventors: Masahiro Ishii, Hyogo (JP); Tetsuo Fukami, Hyogo (JP); Yukinori Kayama, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/793,748

(22) Filed: Feb. 18, 2020

(65) Prior Publication Data

US 2021/0223596 A1    Jul. 22, 2021

(30) Foreign Application Priority Data

Jan. 20, 2020 (CN) .......................... 202010066917.7

(51) Int. Cl.
| | |
|---|---|
| *G02F 1/13* | (2006.01) |
| *G02F 1/1337* | (2006.01) |
| *G02F 1/1339* | (2006.01) |
| *G02F 1/1343* | (2006.01) |
| *G02F 1/1345* | (2006.01) |

(52) U.S. Cl.
CPC .......... *G02F 1/1323* (2013.01); *G02F 1/1337* (2013.01); *G02F 1/1339* (2013.01); *G02F 1/1345* (2013.01); *G02F 1/134309* (2013.01); *G02F 1/133776* (2021.01)

(58) Field of Classification Search
CPC ............ G02F 1/133707; G02F 1/1337; G02F 1/133776; G02F 1/1339; G02F 1/1323; G02F 1/1345

See application file for complete search history.

(56) References Cited

U.S. PATENT DOCUMENTS

| | | | |
|---|---|---|---|
| 2008/0084471 A1 | 4/2008 | Yabuta et al. | |
| 2008/0218459 A1* | 9/2008 | Kim .................. | G02F 1/134309 345/87 |

(Continued)

FOREIGN PATENT DOCUMENTS

CN           101036085          9/2007

*Primary Examiner* — Jia X Pan
(74) *Attorney, Agent, or Firm* — Wenderoth, Lind & Ponack, L.L.P.

(57) ABSTRACT

Disclosed herein are a viewing angle control unit, a substrate assembly of the viewing angle control unit, and a display assembly. The viewing angle control unit includes two substrate assemblies, a liquid crystal (LC) component disposed between the substrate assemblies, and a seal component interconnecting the substrate assemblies and surrounding the LC component. At least one of the substrate assemblies includes a transparent base substrate, a transparent electrode layer disposed on the transparent base substrate, and an alignment film disposed on the transparent electrode layer. The transparent electrode layer has a groove extending along at least part of the seal component, so as to mitigate excessive spreading of a material of the alignment film during manufacturing of the viewing angle control unit. The display assembly includes the viewing angle control unit.

10 Claims, 9 Drawing Sheets

(56) References Cited

U.S. PATENT DOCUMENTS

2014/0285754 A1* 9/2014 Lee .................. G02F 1/133711
349/106
2015/0131041 A1* 5/2015 Moriwaki ......... G02F 1/133305
349/106
2017/0090227 A1* 3/2017 Yun .................. G02F 1/136286

* cited by examiner

VIEWING ANGLE CONTROL UNIT, SUBSTRATE ASSEMBLY OF THE VIEWING ANGLE CONTROL UNIT, AND DISPLAY ASSEMBLY

CROSS-REFERENCE TO RELATED APPLICATION

This application is based on and claims priority of Chinese application No. 202010066917.7 filed on Jan. 20, 2020. The entire disclosure of the above-identified application, including the specification, drawings and claims is incorporated herein by reference in its entirety.

FIELD

The disclosure relates to a viewing angle control unit for controlling a viewing angle of a display screen, and more particularly to a structure of the viewing angle control unit that may mitigate excessive spreading of an alignment film material during production of the viewing angle control unit.

BACKGROUND

Nowadays, mobile computing devices, such as smartphones, tablet computers, and notebook computers, have become indispensable tools in our daily lives. However, when a mobile computing device is used in public, on-screen content may be seen by bystanders. Therefore, a technology of viewing angle control was developed for a display screen that has a wide viewing angle to prevent images displayed on the display screen from being visible to non-users.

Figure 1:
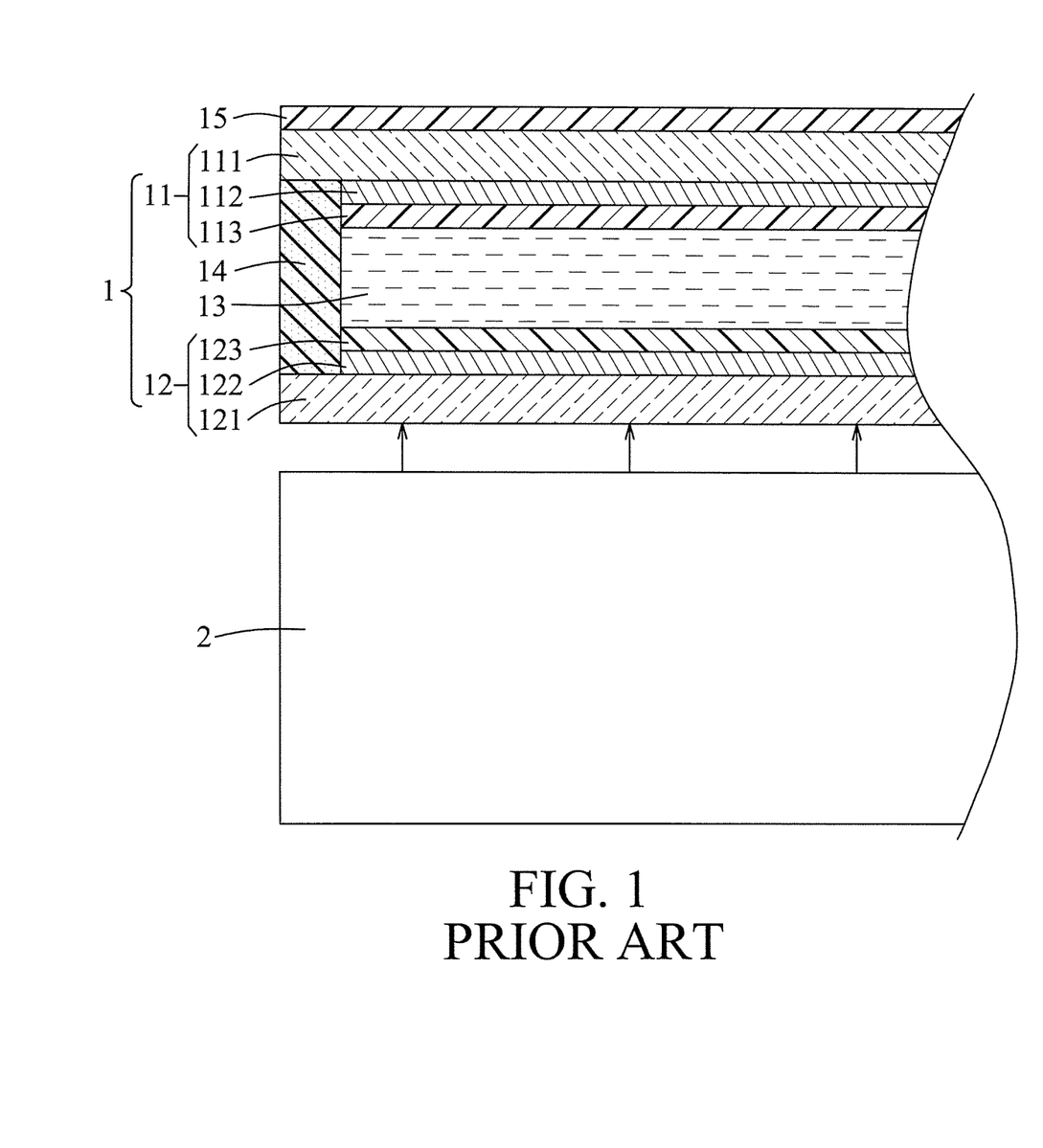
FIG. 1 is a fragmentary, sectional schematic diagram illustrating a conventional structure of a viewing angle control unit.
Figure 2:
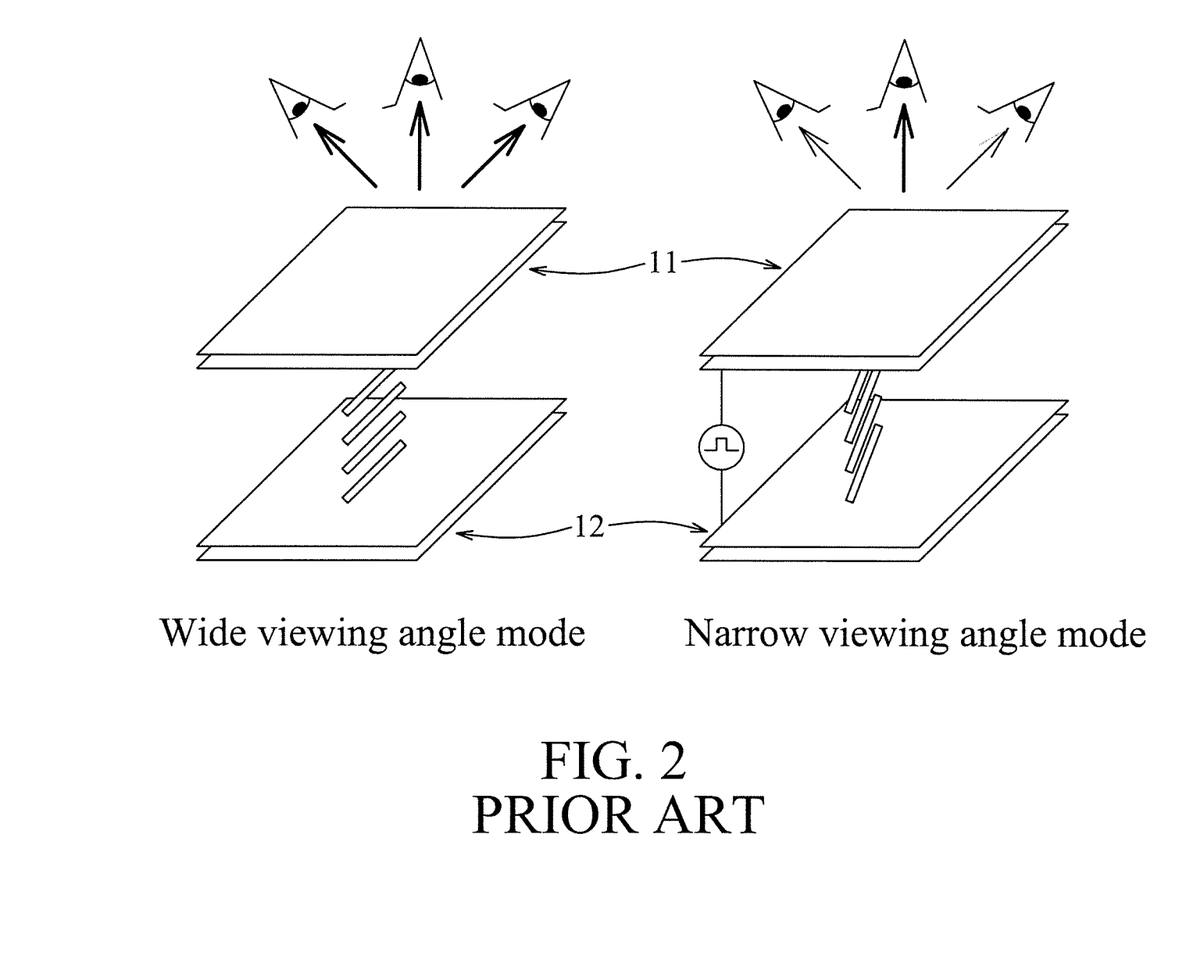
FIG. 2 is a schematic diagram illustrating the viewing angle control unit operating in different modes.

FIG. 1 illustrates a conventional structure of a viewing angle control unit 1. The viewing angle control unit 1 is a liquid crystal (LC) cell that is laid over a display screen 2 of an electronic device (e.g., a mobile computing device), and includes a pair of substrate assemblies 11, 12, an LC component 13 that is disposed between the substrate assemblies 11, 12, a seal component 14 that interconnects the substrate assemblies 11, 12, and a polarizer 15 that is disposed on a front surface of the substrate assembly 11. Each of the substrate assemblies 11, 12 includes a transparent base substrate 111, 121 (e.g., a glass substrate or a plastic substrate), a transparent electrode layer 112, 122 (e.g., an ITO (Indium Tin Oxide) layer) disposed on the transparent base substrate 111, 121, and an alignment film 113, 123 (e.g., a polyimide film) disposed on the transparent electrode layer 112, 122 for controlling a pre-tilt angle of LC molecules. The viewing angle control unit 1 is operable between a wide viewing angle mode and a narrow viewing angle mode. Further referring to FIG. 2, in the wide viewing angle mode, no voltage is applied to the transparent electrode layers 112, 122, such that the LC component 13 does not affect a polarization of light from the display screen 2, maintaining the wide viewing angle of the display screen 2. In the narrow viewing angle mode, a voltage is applied between the transparent electrode layers 112, 122 for orienting the LC molecules of the LC component 13 such that the viewing angle control unit 1 has a low transmittance for light that travels through the viewing angle control unit 1 in a direction slanting to the right or to the left. As a result, people beside a user of the electronic device equipped with the viewing angle control unit 1 can barely see images displayed on the display screen 2, achieving privacy protection.

A common process employed to form the alignment film is to discharge small droplets of an alignment film material onto the transparent electrode layer, with the droplets that land on the transparent electrode layer spreading like liquid to form a uniform alignment film. In such a process, the alignment film material may spread outside a desired area, and thus induce adverse effects. For example, the alignment film material that reaches a sealing region of the substrate assembly where the seal component is to be adhered to in a subsequent process may induce poor adherence between the seal component and the substrate assembly; and the alignment film material that reaches a conductive terminal on the substrate assembly may result in poor conduction between the conductive terminal and other elements.

SUMMARY

Therefore, an object of the disclosure is to provide a viewing angle control unit that can mitigate excessive spreading of the alignment film material.

According to the disclosure, the viewing angle control unit includes a first substrate assembly, a second substrate assembly, an LC component that is disposed between the first and second substrate assemblies, and a seal component that interconnects the first and second substrate assemblies and that surrounds the LC component. At least one of the first and second substrate assemblies includes a transparent base substrate, a transparent electrode layer that is disposed on the transparent base substrate, and an alignment film that is disposed on the transparent electrode layer. The transparent electrode layer has a groove extending along at least part of the seal component.

Another object of the disclosure is to provide a substrate assembly of a viewing angle control unit that can mitigate excessive spreading of the alignment film material. The viewing angle control unit is adapted to overlap a display screen to change a viewing angle of the display screen, and further includes another substrate assembly, an LC component disposed between the substrate assembly and the another substrate assembly, and a seal component surrounding the LC component and interconnecting the substrate assembly and the another substrate assembly.

According to the disclosure, the substrate assembly includes a transparent base substrate, and a transparent electrode layer disposed on the transparent base substrate. The transparent electrode layer includes a first electrode portion to be aligned with and to cover an active area of the display screen, and a second electrode portion that extends outwardly of the first electrode portion. The second electrode portion has a groove extending along at least part of the seal component.

Yet another object of the disclosure is to provide a display assembly that includes a display screen having an active area for displaying images, and a viewing angle control unit that overlaps the display screen to change a viewing angle of the display screen. The viewing angle control unit includes a first substrate assembly, a second substrate assembly, an LC component that is disposed between the first and second substrate assemblies, and a seal component that interconnects the first and second substrate assemblies and that surrounds the LC component. Each of the first and second substrate assemblies includes a transparent base substrate, a transparent electrode layer that is disposed on the transparent base substrate and that includes a first electrode portion aligned with and covering the active area of the display screen, and an alignment film that is disposed on the transparent electrode layer. For at least one of the first and second substrate assemblies, the transparent electrode layer further includes a second electrode portion that extends outwardly of the first electrode portion and that has a groove extending along at least part of the seal component.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
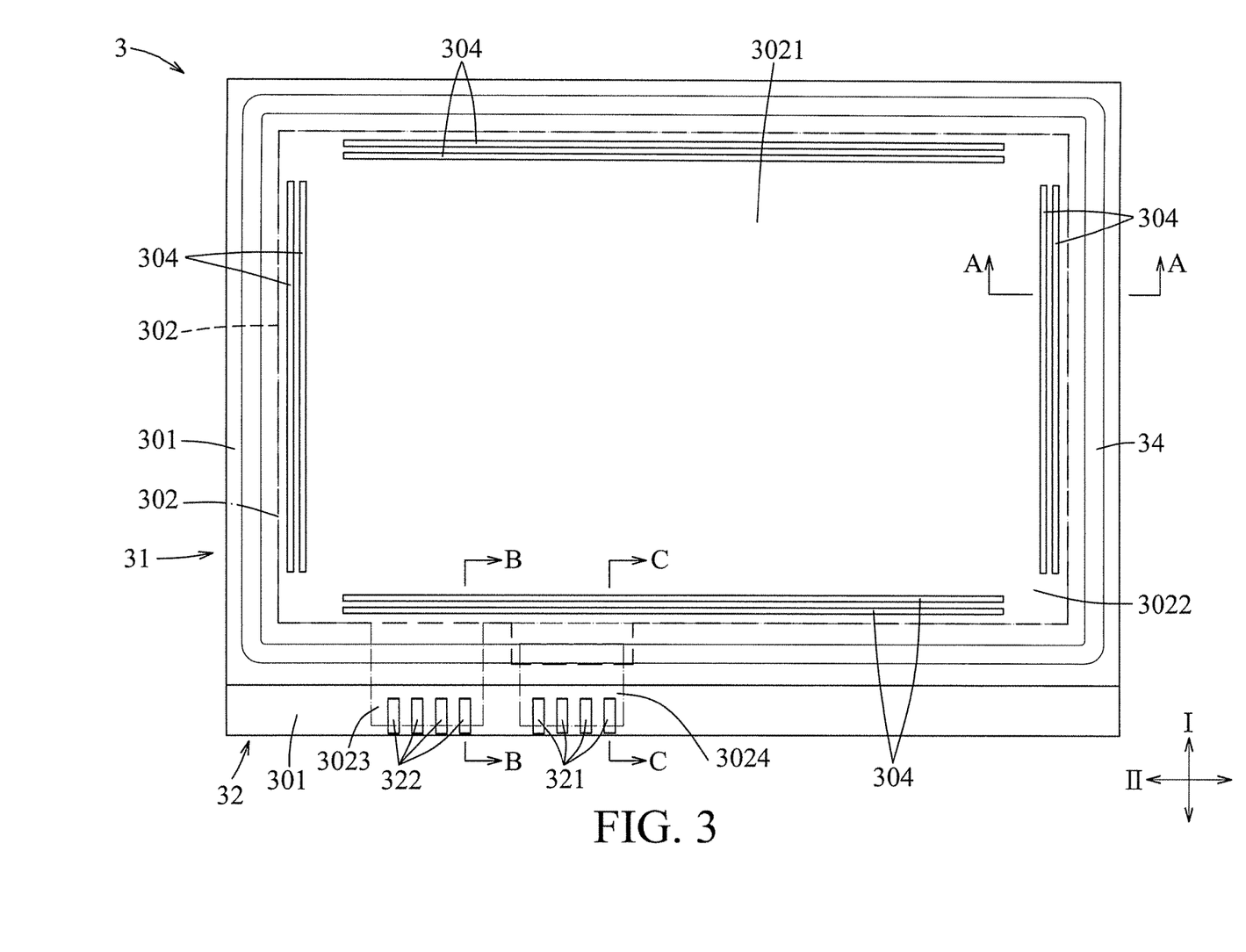
FIG. 3 is a schematic diagram illustrating an embodiment of a viewing angle control unit according to this disclosure.
Figure 4:
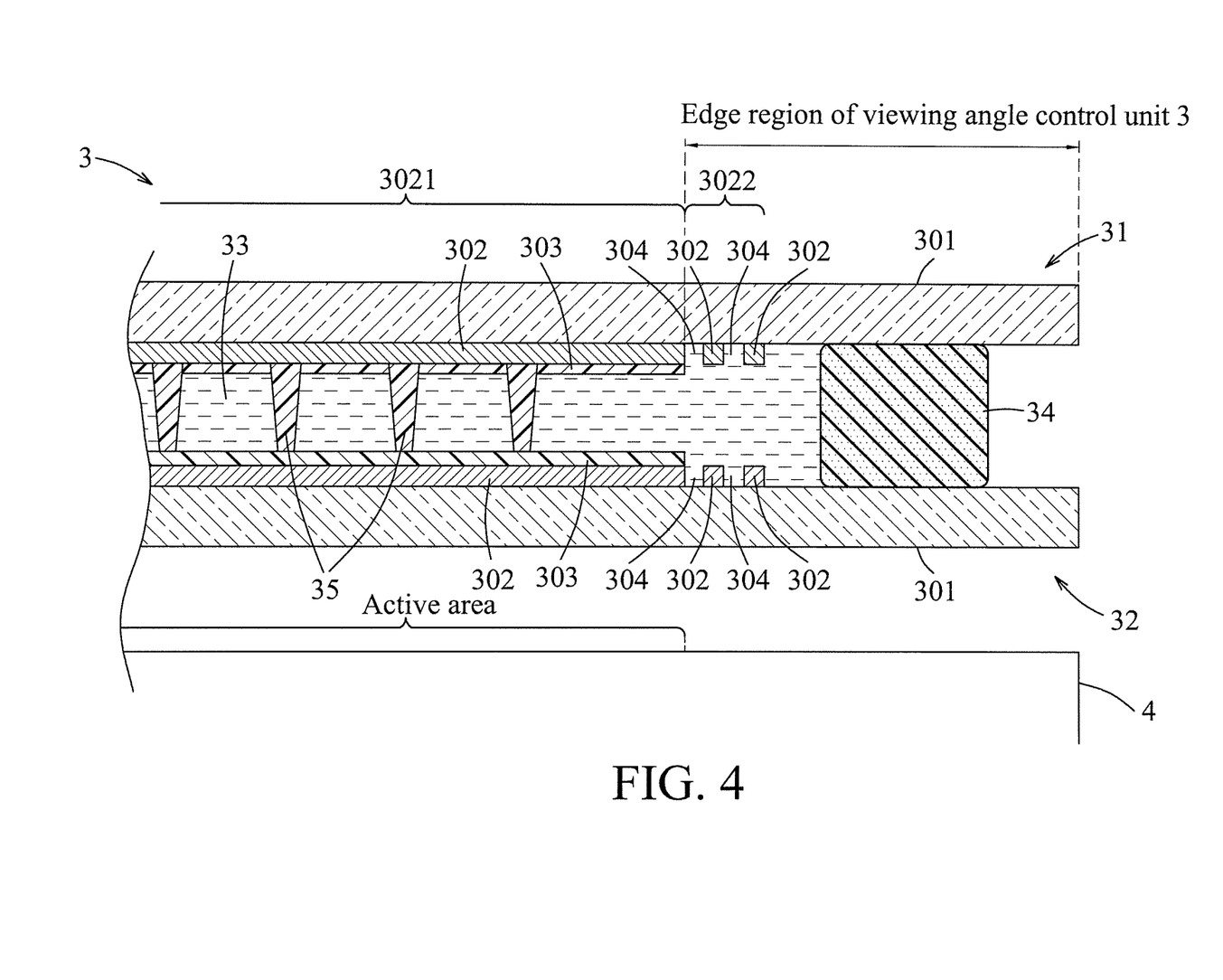
FIG. 4 is a sectional view of the embodiment taken along line A-A in FIG. 3.

FIG. 3 illustrates an embodiment of a viewing angle control unit 3 according to this disclosure, and FIG. 4 illustrates a sectional view of the embodiment along line A-A in FIG. 3. For the purpose of illustration, FIG. 3 is drawn such that some underlying components are visible.

When the viewing angle control unit 3 is in use, the viewing angle control unit 3 overlaps a display screen 4 for changing a viewing angle of the display screen 4, and cooperates with the display screen 4 to form a display assembly. The viewing angle unit 3 includes a first substrate assembly 31 (exemplified as a front substrate assembly), a second substrate assembly 32 (exemplified as a rear substrate assembly), a liquid crystal (LC) component 33 that is disposed between the first and second substrate assemblies 31, 32, a seal component 34 that interconnects the first and second substrate assemblies 31, 32 and that surrounds the LC component 33, and multiple photo spacers 35 that are disposed between the first and second substrate assemblies 31, 32 for maintaining a distance between the first and second substrate assemblies 31, 32.

As shown in FIG. 3, the viewing angle control unit 3 has top, right, bottom and left sides in a perspective view. The top and bottom sides face each other in a first direction (I), while the left and right sides face each other in a second direction (II) transverse to the first direction (I).

At least one of the first and second substrate assemblies 31, 32 includes a transparent base substrate 301 (e.g., a glass substrate or a plastic substrate), a transparent electrode layer 302 (e.g., an ITO layer) disposed on the transparent base substrate 301, and an alignment film 303 (e.g., a polyimide film) disposed on the transparent electrode layer 302. In this embodiment, each of the first and second substrate assemblies 31, 32 includes the transparent base substrate 301, the transparent electrode layer 302, and the alignment film 303. Note that in FIG. 3, a boundary of the transparent electrode layer 302 of the first substrate assembly 31 is depicted using a dashed line, and a boundary of the transparent electrode layer 302 of the second substrate assembly 32 is depicted using a dashed line.

At least one of the first and second substrate assemblies, which is exemplified as the second substrate assembly 32 in this embodiment, further includes a set of first conductive terminals 321 (e.g., metal terminals) that are disposed on the transparent base substrate 301 of the second substrate assembly 32 and outside of the seal component 34 for receiving a first voltage to be provided to the transparent electrode layer 302 of the first substrate assembly 31, and a set of second conductive terminals 322 (e.g., metal terminals) that are disposed on the transparent base substrate 301 of the second substrate assembly 32 and outside of the seal component 34 for receiving a second voltage to be provided to the transparent electrode layer 302 of the second substrate assembly 32.

The transparent electrode layer 302 of at least one of the first and second substrate assemblies 31, 32 has a groove extending along at least part of the seal component 34. In this embodiment, for each of the first and second substrate assemblies 31, 32, the transparent electrode layer 302 has a plurality of grooves 304, each of which extends along a part of the seal component 34. In the transparent electrode layer 302 of each of the first and second substrate assemblies 31, 32, proximate to each of four lateral sides of the viewing angle control unit 3 (the top, right, bottom, left sides from the perspective of FIG. 3), there are formed two grooves 304 that extend in one direction along the corresponding part of the seal component 34, and that are arranged in another direction transverse to the one direction. Specifically, in the transparent electrode layer 302 of each of the first and second substrate assemblies 31, 32, proximate to each of the left and right sides of the viewing angle control unit 3, there are formed two grooves 304 that extend in the first direction (I) along the corresponding part of the seal component 34, and that are arranged in the second direction (II). In the transparent electrode layer 302 of each of the first and second substrate assemblies 31, 32, proximate to each of the top and bottom sides of the viewing angle control unit 3, there are formed two grooves 304 that extend in the second direction (II) along the corresponding part of the seal component 34, and that are arranged in the first direction (I).

In some implementations, for either of the first and second substrate assemblies 31, 32, the transparent electrode layer 302 may have only one groove 304. In some implementations, the groove(s) 304 of the transparent electrode layer 302 may be formed nearby only one lateral side of the viewing angle control unit 3. In some implementations, the groove(s) 304 may be formed in the transparent electrode layer 302 of only one of the first and second substrate assemblies 31, 32, while, for the other one of the first and second substrate assemblies 31, 32, the transparent electrode layer 302 is not formed with any such groove extending along the seal component 34. When an alignment film material used to form the alignment film 303 spreads and reaches an edge defining any one of the grooves 304 during the manufacturing process, the surface tension of the alignment film material can resist spreading of the alignment film material into said groove 304, preventing the alignment film material from reaching the undesired area outside of the grooves 304.

For each of the first and second substrate assemblies 31, 32, the transparent electrode layer 302 includes a first electrode portion 3021 and a second electrode portion 3022. The first electrode portion 3021 is disposed more inward relative to the seal component 34, and is aligned with and covers an active area (i.e., a display region) of the display screen 4 when the viewing angle control unit 3 is used with the display screen 4 to together form the display assembly. The active area of the display screen 4 is for displaying images. The second electrode portion 3022 is disposed outside of the first electrode portion 3021, and the grooves 304 that are used to mitigate excessive spreading of the alignment film material are formed in the second electrode portion 3022.

Figure 5:
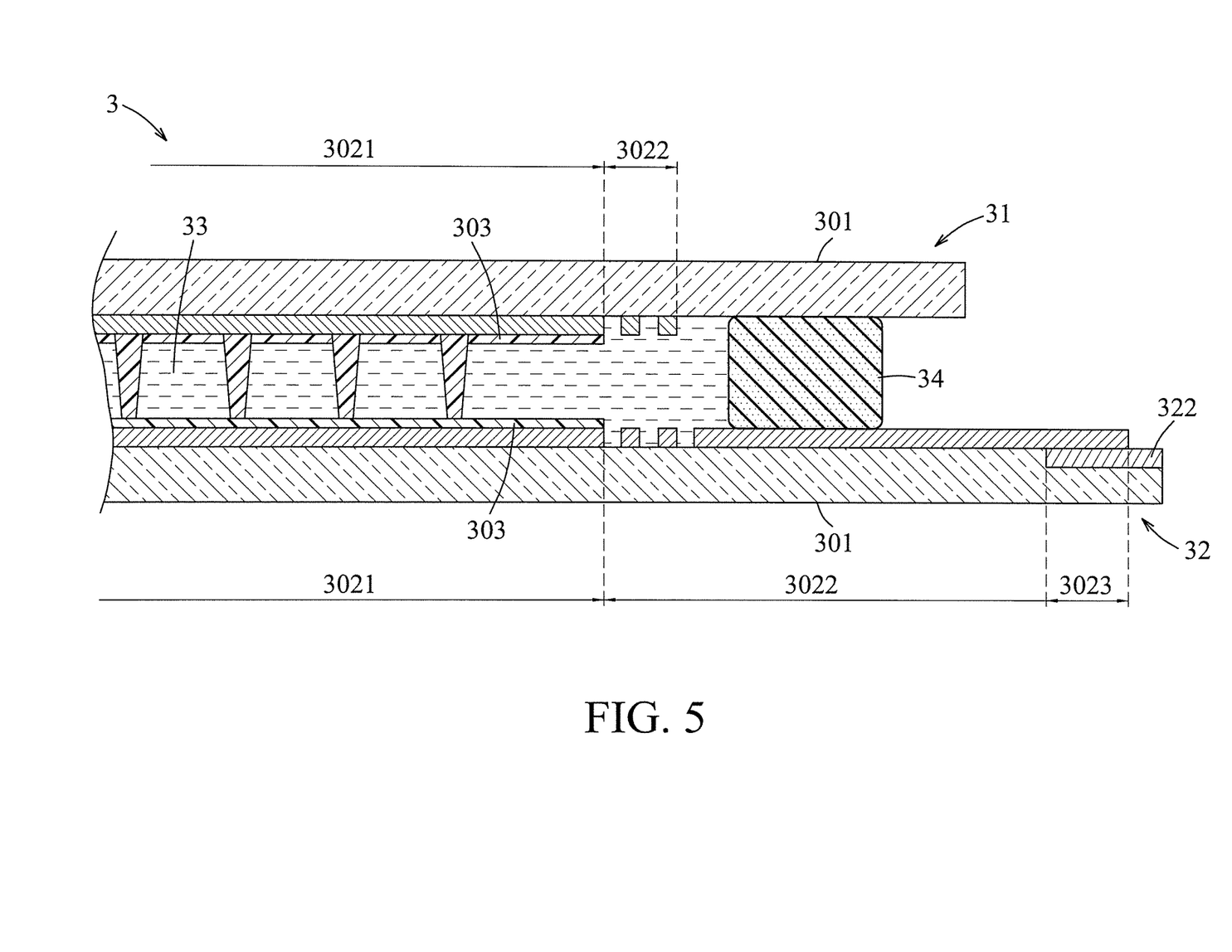
FIG. 5 is a sectional view of the embodiment taken along line B-B in FIG. 3.
Figure 6:
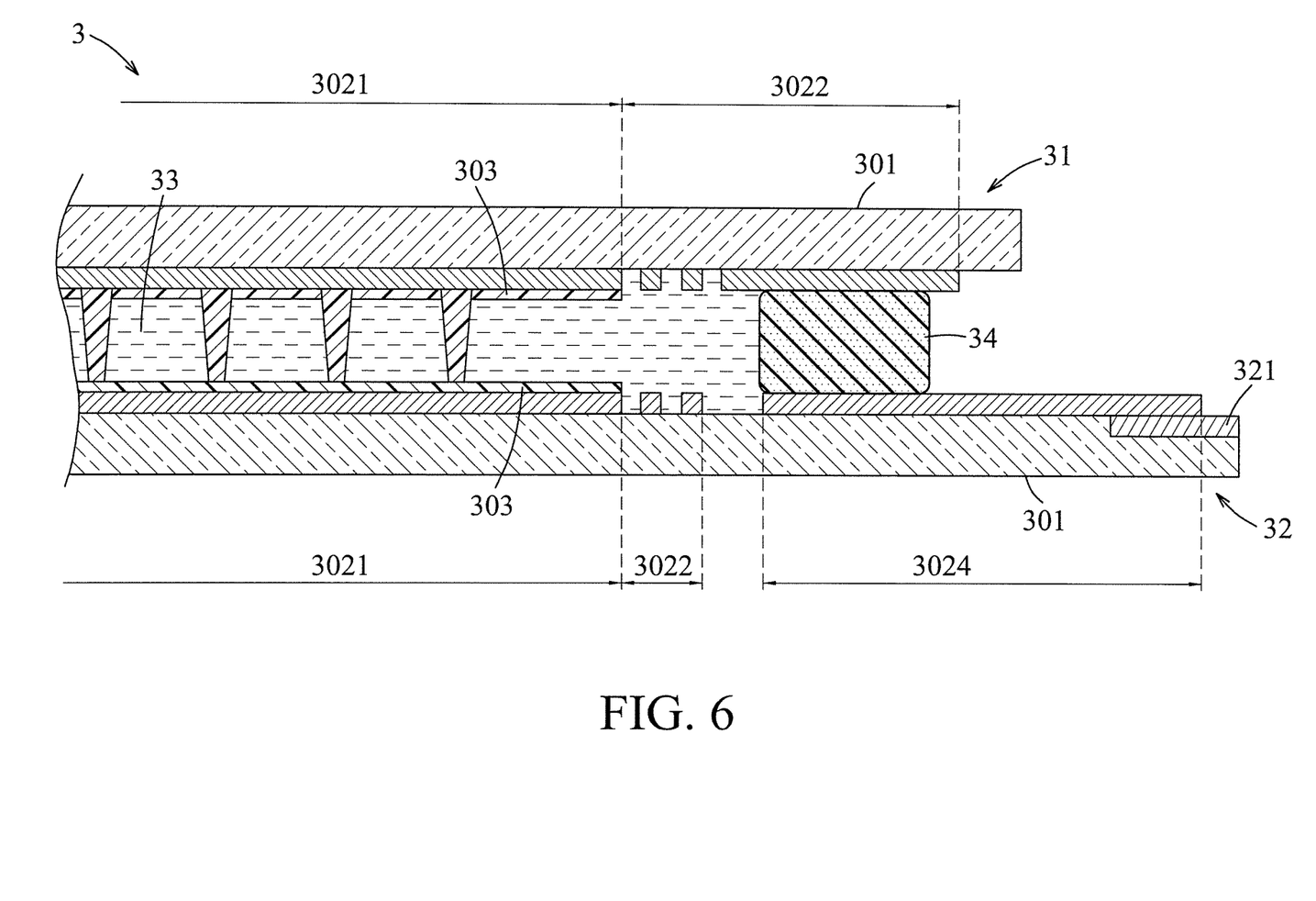
FIG. 6 is a sectional view of the embodiment taken along line C-C in FIG. 3.

In detail, the second electrode portion 3022 extends outwardly of the first electrode portion 3021. The transparent electrode layer 302 of the second substrate assembly 32 further includes a third electrode portion 3023 and a fourth electrode portion 3024. Referring to FIGS. 3 and 5, the third electrode portion 3023 is connected to and extends outwardly of the second electrode portion 3022, is spaced apart from the first electrode portion 3021 by the second electrode portion 3022, is electrically connected to the first electrode portion 3021 via the second electrode portion 3022, and is electrically connected to and in contact with the second conductive terminals 322 for receiving the second voltage therefrom. Referring to FIGS. 3 and 6, the fourth electrode portion 3024 is spaced apart from the first, second and third electrode portions 3021, 3022, 3023, and electrically interconnects the first terminals 321 and the seal component 34 that contains conductive beads therein.

For the first substrate assembly 31, the second electrode portion 3022 thereof is in contact with the seal component 34, so as to receive the first voltage via a conductive path established by the first terminals 321, the fourth electrode portion 3024 of the transparent electrode layer 302 of the second substrate assembly 32, and the seal component 34. It should be noted that the conductive beads in the seal component 34 are conductive in a direction of applied pressure, so the seal component 34 is conductive in the direction of its thickness, thereby establishing the conductive path between the fourth electrode portion 3024 of the second substrate assembly 32 and the transparent electrode layer 302 of the first substrate assembly 31. On the other hand, since no pressure is applied to the seal component 34 in directions parallel to the first and second substrate assemblies 31, 32, the seal component 34 is non-conductive in these directions, preventing formation of undesired short circuits between the transparent electrode layers 302 of the first and second substrate assemblies 31, 32.

For each of the first and second substrate assemblies 31, 32, the grooves 304 are positioned on the transparent electrode layer 302 thereof at edge portions of the transparent electrode layer 302, and are more inward relative to the seal component 34, so as to resist spreading of the alignment film material to a region where the seal component 34 is disposed, which may result in poor adhesion between the seal component 34 and the first and second substrate assemblies 31, 32. In this embodiment, the grooves 304 do not extend to corner portions of the transparent electrode layer 302, i.e., the corner portions are free of grooves 304, so as to ensure transmission of electricity through the second electrode portion 3022.

Figure 7:
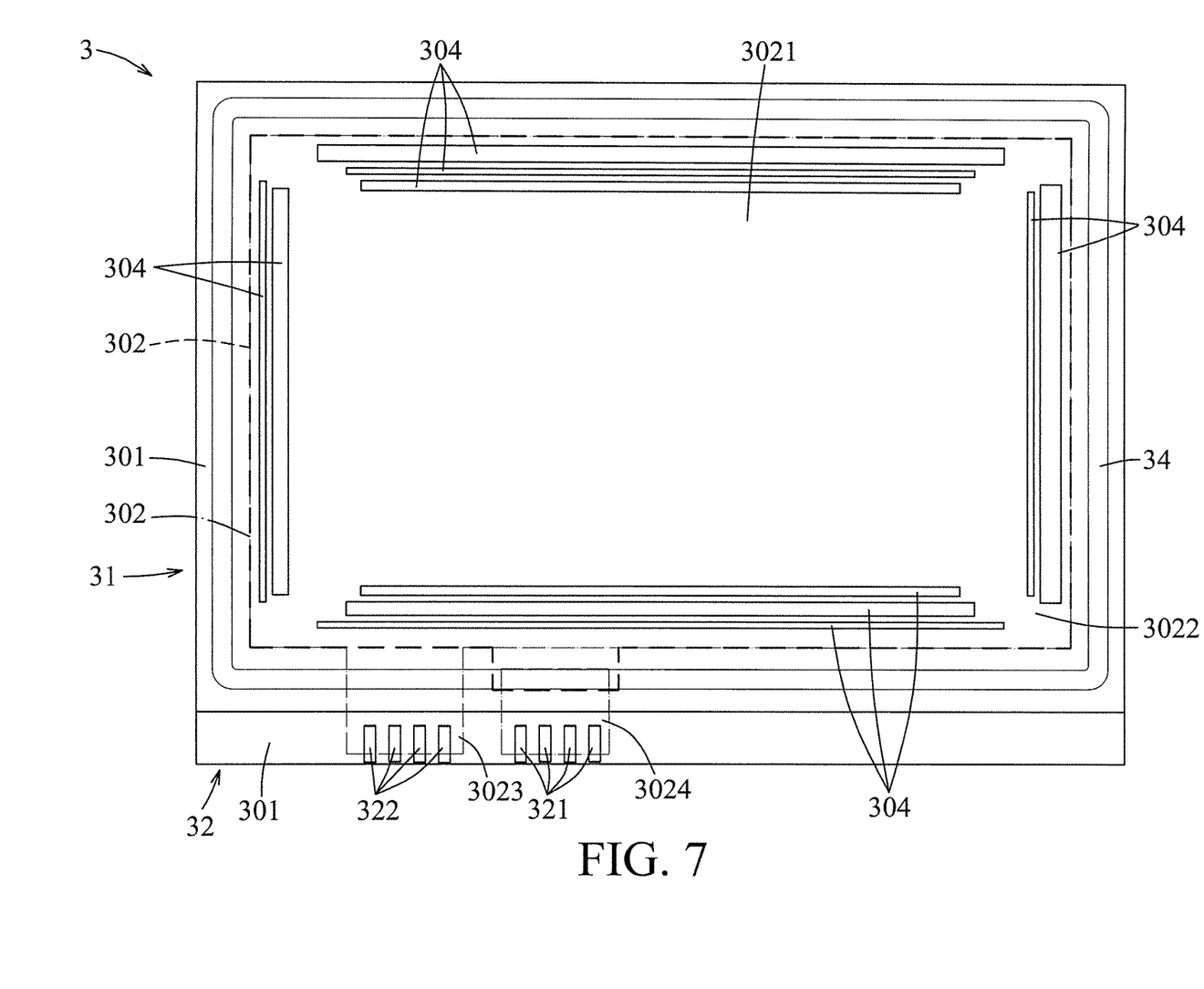
FIG. 7 is a schematic diagram illustrating a variation of the embodiment.

FIG. 7 illustrates a variation of the embodiment. In this variation, like the embodiment illustrated in FIG. 3, the transparent electrode layer 302 of one or both of the first and second substrate assemblies 31, 32 has multiple grooves 304 at each of the edge portions thereof. This variation differs from the embodiment illustrated in FIG. 3 in two aspects. First, at any edge portion having multiple grooves 304, the more inward the groove 304, the smaller the length thereof. For example, for the two grooves 304 that are positioned at the right edge portion (to the right hand side of FIG. 7), the left one of the grooves 304 is positioned more inward relative to the right one of the grooves 304 (closer to the first electrode portion 3021 than the right one of the grooves 304), and is smaller in length (i.e., shorter) than the right one of the grooves 304. Second, at each edge portion, the grooves 304 are different in width. For example, all three grooves 304 that are positioned at the top edge portion (toward the upper side of FIG. 7) have different widths; among them, the middle one of the grooves 304 is smallest in width (narrowest), whilst the uppermost one of the grooves 304 is the greatest in width (thickest).

It is noted that the two characteristics are independent of each other, and are not necessarily co-existent in a single implementation. In other words, there may be an implementation where for each edge portion, the grooves are different in width yet a more inward groove is not shorter than a more outward groove, or there may be an implementation where for each edge portion, the more inward groove is shorter than a more outward groove, but they have the same width. With the grooves decreasing in length in an inward direction, it may be easier to ensure proper transmission of electricity through the second electrode portion 3022. Variation in the widths of the grooves 304 may enhance resistance against excessive spreading of the alignment film material.

Figure 8:
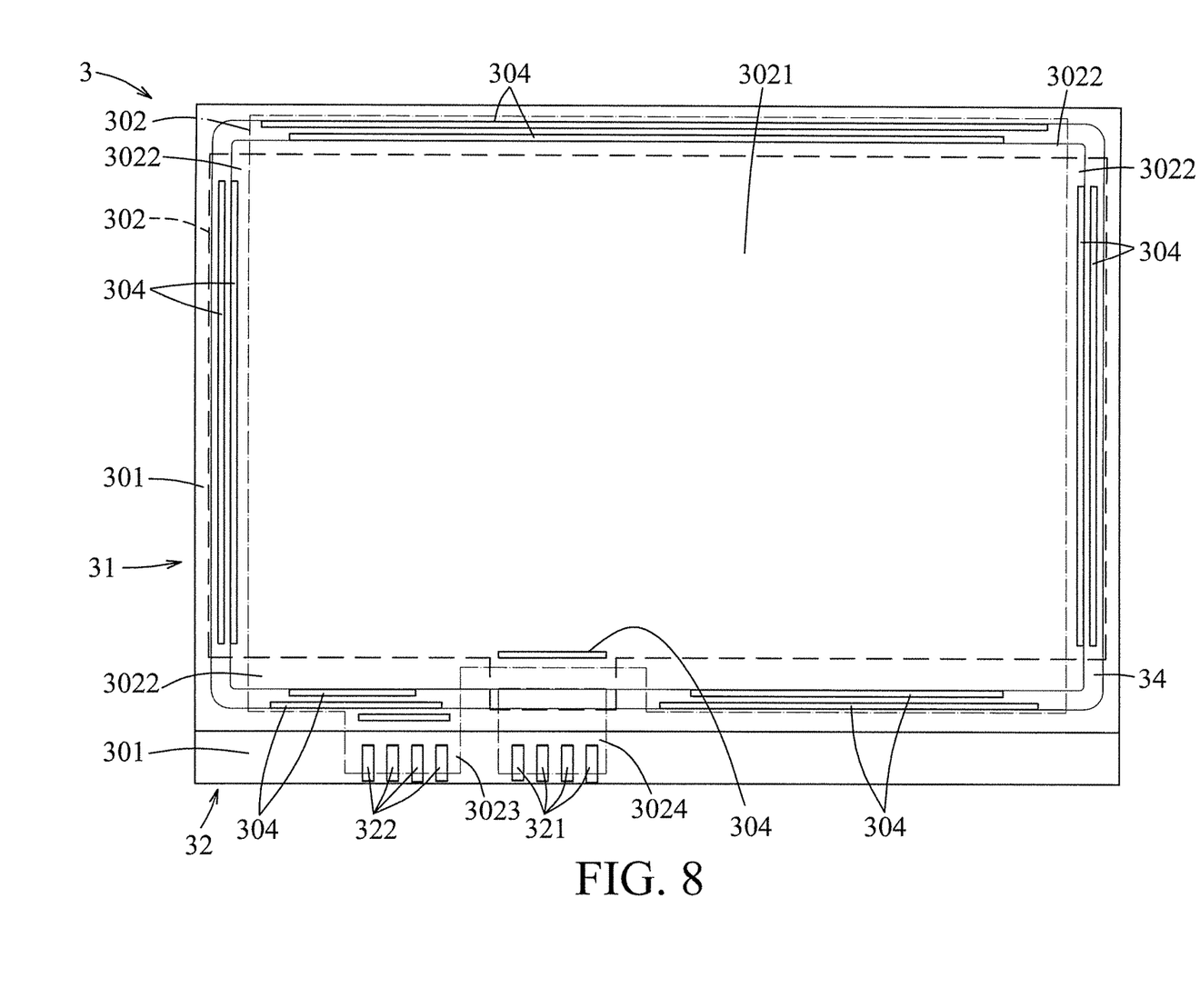
FIG. 8 is a schematic diagram illustrating another variation of the embodiment.

FIG. 8 illustrates another variation of the embodiment. For one or both of the first and second substrate assemblies 31, 32, the transparent electrode layer 302 has a sealing region overlapping with the seal component 34. This variation differs from the embodiment illustrated in FIG. 3 in two independent aspects: 1) at one or more edge portions of the transparent electrode layer 302, some or all of the grooves 304 are positioned within the sealing region; and 2) for the second substrate assembly 32, at least one groove 304 is positioned between the sealing region and the third electrode portion 3023.

It is noted that the two characteristics are independent of each other, and are not necessarily co-existent in a single implementation. Placing the groove(s) 304 within the sealing region may create a narrower edge region (a portion of the viewing angle control unit 3 between an edge of the viewing angle control unit 3 and a region of the viewing angle control unit 3 that corresponds in position to the active area of the display screen 4, as exemplified in FIG. 4) for the viewing angle control unit 3. Placing one or more grooves 304 between the sealing region and the third electrode portion 3023 may enhance resistance against spreading of the alignment film material toward the conductive terminals 322.

Furthermore, in this variation, the transparent electrode layer 302 of the second substrate assembly does not overlap the seal component 34 and the transparent electrode layer 302 of the first substrate assembly 31 at the same spots (where there is an overlap between the transparent electrode layer 302 of the second substrate assembly 32 and the seal component 34, the transparent electrode layer 302 of the second substrate assembly 32 does not also overlap the transparent electrode layer 302 of the first substrate assembly 31, and vice versa) except for the fourth electrode portion 3024, thereby preventing transmission of the second voltage from the transparent electrode layer 302 of the second substrate assembly 32 to the transparent electrode layer 302 of the first substrate assembly 31 via the sealing component 34, and preventing transmission of the first voltage from the transparent electrode layer 302 of the first substrate assembly 31 to the transparent electrode layer 302 of the second substrate assembly 32 via the sealing component 34.

In this variation, the transparent electrode layer 302 of the first substrate assembly 31 may not include any grooves around the top side of the viewing angle control unit 3.

Figure 9:
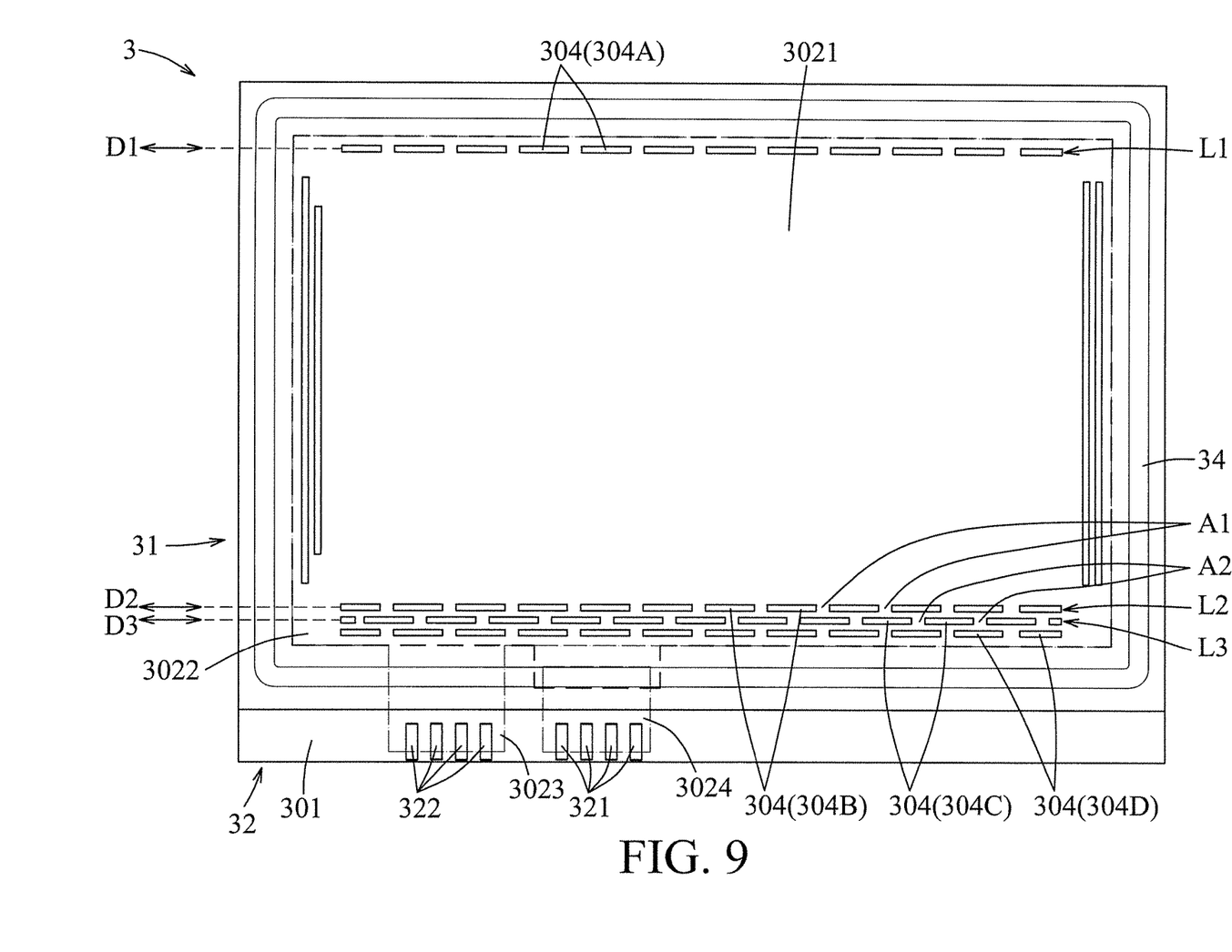
FIG. 9 is a schematic diagram illustrating yet another variation of the embodiment.

FIG. 9 illustrates yet another variation of the embodiment. For one or both of the first and second substrate assemblies 31, 32, some grooves 304 at at least one edge portion of the transparent electrode layer 302 may cooperatively form a pattern of a broken line.

For example, in FIG. 9, there are a plurality of grooves 304A at the upper edge portion of the transparent electrode layer 302 that extend in an extending direction D1, and that are spaced apart from and aligned with each other in the extending direction D1, thereby cooperatively forming a pattern of a broken line L1. It is noted that even if any of the grooves 304A is not shaped as a straight line (e.g., is curved), the pattern cooperatively formed by the grooves 304A is still considered a broken line from a macroscopic perspective. Such configuration may enhance transmission of electricity from the conductive terminals 321 or 322 to the corresponding first electrode portion 3021 in comparison to the previous implementations.

There are also multiple grooves 304 at the lower edge portion of the transparent electrode layer 302, including first grooves 304B, second grooves 304C, and third grooves 304D. The first grooves 304B extend in an extending direction D2, and are spaced apart from and aligned with each other in the extending direction D2, thereby cooperatively forming a pattern of a broken line L2. The second grooves 304C extend in an extending direction D3, and are spaced apart from and aligned with each other in the extending direction D3, thereby cooperatively forming a pattern of a broken line L3. The second grooves 304C are adjacent to the first grooves 304B in a direction perpendicular to the extending direction D2, and the first grooves 304B are positioned closer to a center of the viewing angle control unit 3 than the second grooves 304C. In other words, the first grooves 304B are positioned between the second grooves 304C and the first electrode portion 3021. It is noted that the extending directions D2, D3 are not necessarily parallel with each other. An area A1 of the transparent electrode layer 302 between any adjacent two of the first grooves 304B is aligned with one of the second grooves 304C in the direction perpendicular to the extending direction D2, and an area A2 of the transparent electrode layer 302 between any adjacent two of the second grooves 304C is aligned with one of the first grooves 304B in a direction perpendicular to the extending direction D3. In other words, areas A1 of the transparent electrode layer 302 between any adjacent two of the first grooves 304B are staggered with areas A2 of the transparent electrode layer 302 between any adjacent two of the second grooves 304C. Since a relationship between the second grooves 304C and the third grooves 304D is similar to that between the first grooves 304B and the second grooves 304C, details thereof are not repeated herein for the sake of brevity.

For an edge portion, by forming multiple rows of disconnected grooves and arranging them in a staggering manner, a better ability of stopping excessive spreading of the alignment film material may be achieved in comparison to forming a single row of disconnected grooves (e.g., the case of the upper edge portion in FIG. 9), while good conduction can be maintained between the conductive terminals 321 or 322 and the corresponding first electrode portion 3021.

It is noted that the different variations may be combined in practice. For example, the grooves 304 may form a pattern of multiple broken lines as shown in FIG. 9, and be positioned within the sealing region of the transparent electrode layer 302, as shown in FIG. 8. This disclosure is not limited to any specific combination of the variations.

In summary, by forming one or more grooves 304 in the transparent electrode layer 302 along the seal component 34, spreading of the alignment film material to undesired regions can be mitigated during fabrication of the viewing control unit 3. In addition, multiple variations are provided in this disclosure to achieve different effects.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A viewing angle control unit comprising:
   a first substrate assembly and a second substrate assembly, at least one of which includes
   a transparent base substrate,
   a transparent electrode layer that is disposed on said transparent base substrate,
   a conductive terminal disposed on said transparent base substrate, and
   an alignment film that is disposed on said transparent electrode layer;
   a liquid crystal (LC) component disposed between said first and second substrate assemblies; and
   a seal component interconnecting said first and second substrate assemblies, and surrounding said LC component,
   wherein said transparent electrode layer includes:
   a first electrode portion that is disposed more inward relative to said seal component;
   a second electrode portion that is disposed outside of said first electrode portion; and
   a third electrode portion that is connected to said second electrode portion, that is spaced apart from said first electrode portion by said second electrode portion, that is electrically connected to said first electrode portion via said second electrode portion, and that is to be electrically connected to said conductive terminal for receiving a voltage therefrom, wherein said transparent electrode layer has a first groove extending along at least part of the seal component, wherein said first groove is included in the second electrode portion, wherein said conductive terminal is in contact with said third electrode portion, and wherein said second electrode portion has a sealing region overlapping with said seal component, and said first groove is positioned between said sealing region and said third electrode portion.

2. The viewing angle control unit of claim 1,
wherein said transparent electrode layer further has a second groove extending along at least part of the seal component, and
wherein said second groove is positioned more inward relative to said seal component.

3. The viewing angle control unit of claim 1,
wherein said transparent electrode layer further has a second groove and a third groove extending in a first direction along at least part of the seal component, and
said second groove and said third groove are arranged in a second direction transverse to the first direction.

4. The viewing angle control unit of claim 3, wherein said second groove is positioned more inward relative to said third groove, and said second groove is smaller in length than said third groove.

5. The viewing angle control unit of claim 3, wherein said second groove and said third groove are different in width.

6. The viewing angle control unit of claim 1,
wherein said transparent electrode layer further has a second groove extending along at least part of the seal component, and
wherein said second groove is positioned within said sealing region.

7. The viewing angle control unit of claim 1, wherein
said transparent electrode layer further has second grooves extending in a first direction along at least part of the seal component, and
said second grooves are spaced apart from and aligned with each other in the first direction.

8. The viewing angle control unit of claim 7, wherein said transparent electrode layer further has third grooves extending in the first direction, and that are spaced apart from and aligned with each other in the first direction;
wherein said second grooves are adjacent to said third grooves in a direction perpendicular to the first direction, and said second grooves are positioned closer to a center of said viewing angle control unit than said third grooves;
wherein an area of said transparent electrode layer between any adjacent two of said second grooves is aligned with one of said third grooves in the direction perpendicular to the first direction, and an area of said transparent electrode layer between any adjacent two of said third grooves is aligned with one of said second grooves in a direction perpendicular to the first direction.

9. The viewing angle control unit of claim 1, wherein said transparent electrode layer further has second grooves and third grooves extending along at least part of the seal component, and
said second grooves cooperatively form a pattern of a broken line,
said third grooves cooperatively form a pattern of a broken line;
wherein said third grooves are adjacent to said second grooves, and said second grooves are positioned between said third grooves and said first electrode portion;
wherein areas of said transparent electrode layer between any adjacent two of said second grooves are staggered with areas of said transparent electrode layer between any adjacent two of said third grooves.

10. A display assembly comprising:
a display screen having an active area for displaying images; and
a viewing angle control unit overlapping said display screen to change a viewing angle of said display screen, and including:
a first substrate assembly and a second substrate assembly, wherein each of said first and second substrate assemblies includes
a transparent base substrate,
a transparent electrode layer that is disposed on said transparent base substrate,
a conductive terminal disposed on said transparent base substrate, and
an alignment film that is disposed on said transparent electrode layer;
a liquid crystal (LC) component disposed between said first and second substrate assemblies; and
a seal component interconnecting said first and second substrate assemblies, and surrounding said LC component;
wherein, for at least one of said first and second substrate assemblies, said transparent electrode layer includes:
a first electrode portion aligned with and covering said active area of said display screen:
a second electrode portion that extends outwardly of said first electrode portion; and
a third electrode portion that is connected to said second electrode portion, that is spaced apart from said first electrode portion by said second electrode portion, that is electrically connected to said first electrode portion via said second electrode portion, and that is to be electrically connected to said conductive terminal for receiving a voltage therefrom,
wherein said transparent electrode layer has a groove extending along at least part of said seal component,
wherein said groove is included in the second electrode portion,
wherein said conductive terminal is in contact with said third electrode portion, and
wherein said second electrode portion has a sealing region overlapping with said seal component, and said first groove is positioned between said sealing region and said third electrode portion.

* * * * *